Dec. 22, 1964 R. NYKL 3,162,810

STEREOPHONIC REPRODUCTION METHOD AND APPARATUS

Filed April 23, 1962

INVENTOR.
ROBERT NYKL

BY H. Keith Schoff

ATTORNEY

United States Patent Office 3,162,810

Patented Dec. 22, 1964

3,162,810

STEREOPHONIC REPRODUCTION METHOD AND APPARATUS

Robert Nykl, 3578 E. Washington Ave., Madison, Wis.

Filed Apr. 23, 1962, Ser. No. 189,533
4 Claims. (Cl. 325—36)

This invention relates to stereophonic amplification means and method for frequency modulation (FM) radio receivers, and more particularly relates to means comprising two audio-frequency amplifiers providing distinct and dissimilar amplified signals which, when heard in unison, produce stereophonic sound having exceptional timbre and harmonic quality. A preferred embodiment of the invention consists of a conventional FM radio receiver, audio amplifier and speaker, such as may be used in conventional household radio or television sets, and a second, inventive audio amplifier and speaker connected between the resonant frequency amplifying stage of the receiver and the audio frequency amplifying stage of the conventional amplifier. The inventive amplifier may be a feedback type modified to provide regenerative feedback from the speaker transformer to an audio amplifying tube, rather than degenerative feedback from the speaker transformer as is more conventional. Audio-oscillation would normally result in a regenerative feedback circuit, but is suppressed in the inventive amplifier of this invention by adding sufficient cathode resistance to the audio frequency amplification tube in the feedback circuit. The regenerative feedback coupling causes short wave length radiation to emanate from the oscillating feedback circuit. It is desirable to place a shield apart from an oscillating tube a sufficient distance to prevent excessive capacitive coupling between the tube and shield.

It is an object of this invention to provide stereophonic audio reproduction having a high degree of timbre and harmonic quality.

It is another object of this invention to provide stereophonic sound using a single, frequency modulated radio signal.

It is another object of this invention to provide stereophonic amplification using in conjunction a conventional amplifier such as are used in television or FM radio sets, with auxiliary audio amplifier to provide stereophonic audio-reproduction.

It is another object of this invention to provide an inexpensive means for producing stereophonic sound from a frequency modulated radio signal.

It is another object of this invention to provide sound of apparent great intensity from amplifiers having a relatively small power rating.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

Figures 1, 2, 3:
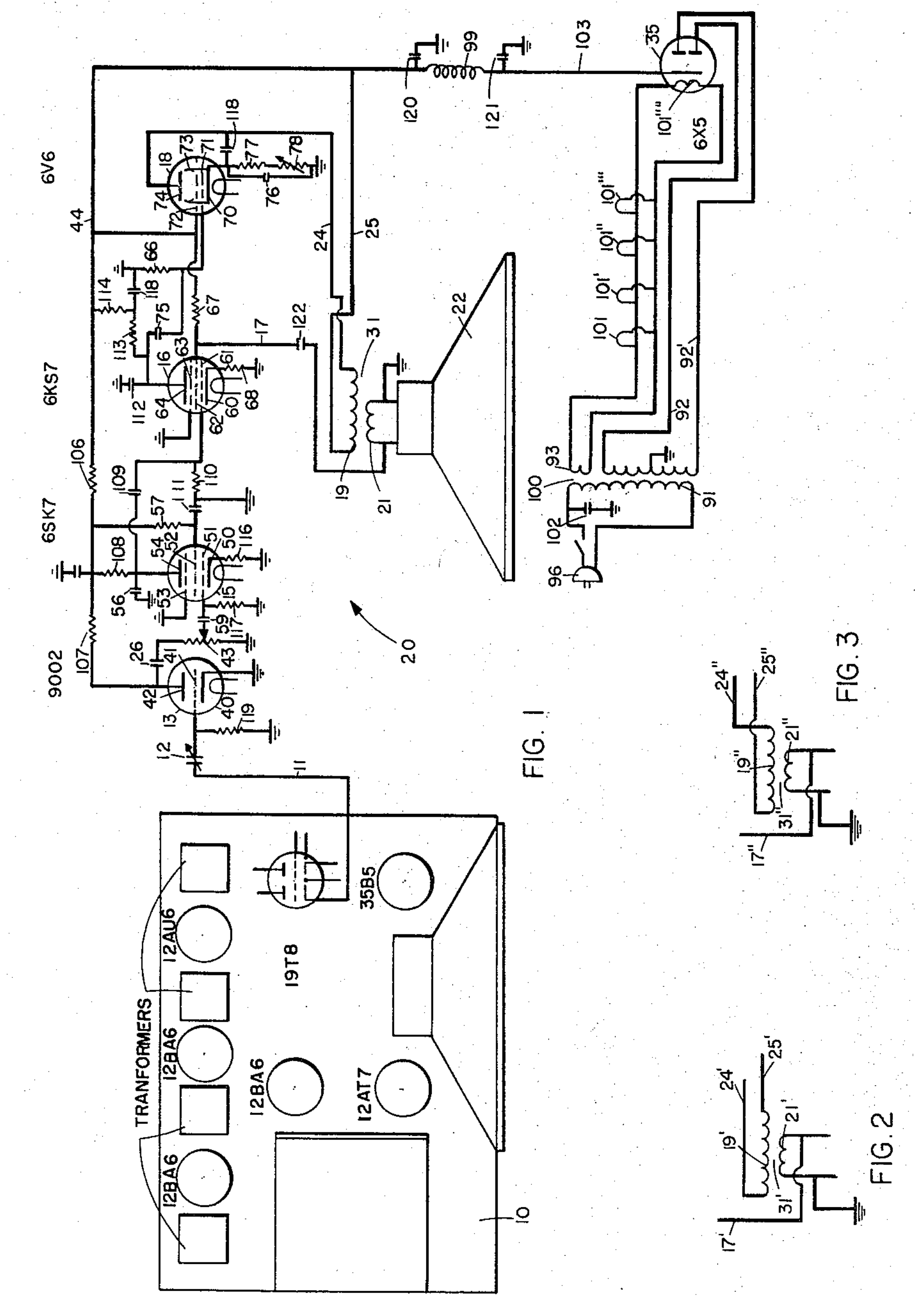
FIGURE 1 is a circuit diagram of one embodiment of a sound reproduction system of this invention incorporating an FM radio receiver.
FIGURE 2 is a circuit diagram of a modification of a portion of the apparatus of FIGURE 1.
FIGURE 3 is a circuit diagram of a portion of a conventional amplifier similar to the apparatus of FIGURE 1 but which incorporates degenerative feedback coupling from the speaker transformer to an audio-amplifying tube.

A preferred embodiment of this invention incorporates a detector having a linear characteristic which passes only relatively high frequencies; a regenerative feedback circuit between the speaker transformer and an audio amplifying tube; and a variable resistor for biasing the cathode resistance of the audio frequency amplifying tube to suppress audio oscillation in the feedback circuit. Regenerative, rather than degenerative coupling, in the audio portion of an amplifier circuit has heretofore been considered extremely undesirable because of the impossibility of maintaining a definite phase relation in a feedback circuit. Audio oscillation results. This invention utilizes sufficient resistance in the cathode of a tube in the feedback circuit to suppress oscillation of audio frequencies without destroying higher, harmonic frequencies which provide the acoustic output with exceptional timbre and harmonic quality. When the inventive speaker is audibly tuned to match the acoustic output of the conventional speaker (so that the source of sound from the two speakers cannot be distinguished as emanating from either of the speakers) the effect is to provide a listener with the sensation of hearing sound having greatly increased timbre from that which is normally obtained from sound reproduction apparatus. Further, the apparent intensity of sound is exceptionally great for the power output of the speakers and does not perceptibly diminish with distance until the listener is inordinately far from the speakers. The inventive amplifier is easily tuned by manual biasing of the cathode resistance of an audio amplifying tube until audible oscillation is suppressed. Conventional volume controls are provided for balancing of the sound volume produced by each of the two speakers. At the threshold of detectable audible oscillation, the greatest perception of timbre is realized, and it is therefore preferred to bias the cathode resistance of an audio amplifying tube to only suppress audio oscillation. If the cathode resistance is increased beyond the value necessary to suppress audio oscillation, the timbre quality of the sound produced is decreased.

Referring now to FIGURE 1, there is shown conventional AM-FM receiver and audio amplifier 10 and inventive amplifier 20 connected to provide parallel speaker channels for an amplified resonant frequency (RF) signal. Amplifier 10 as shown in FIGURE 1 may be any conventional AM-FM receiver and amplifier with attached speaker such as those which are used in radio or television sets, the one illustrated being a Zenith Radio Corporation Model 7H920; chassis 7F01. The 7F01 chassis incorporates a super heterodyne circuit with two stages of intermediate frequency (IF) amplification and one stage of RF amplification on all bands. The legends applied to the drawing indicate the principal components of the receiver. To pin 3 of discriminator-detector tube 19T8 of amplifier 10 is connected input lead 11 to amplifier 20, which is the inventive amplifier herein. Amplifier 20 comprises two stages of audio frequency (AF) amplification only. Variable capacitor 12 of 0–1000 micro-microfarads (mmf.) capacity is provided in lead 11. This capacitor may be biased in conjunction with cathode variable resistor 78 of output tube 6V6, but is normally set at about 50 mmf. If desired, a fixed value capacitor may be substituted for variable capacitor 12. Detector 13 preferably has a linear characteristic and preferably comprises a 9002 tube. Grid 41 of tube 13 is grounded through 1 megohm resistor 119. Tubes 15 and 16 may comprise 6SK7 audio frequency amplification tubes followed by output tube 18 which may comprise a 6V6GT tube. Feedback lead 17 from speaker transformer 31 is connected thereto through .02 mfd. capacitor 122. Connection is made to primary winding 19 of speaker transformer 31 as shown in FIGURE 1, or may be made to secondary winding 21 of speaker transformer 31′ as shown in FIGURE 2, in either case to the opposite side of the winding to which it is connected from that which would be used to provide conventional degenerative coupling (as shown in FIGURE 3) and being so connected provides instead regenerative feedback coupling.

The circuit component characteristics and values given herein are illustrative only, and do not limit the invention to the one embodiment described in detailed herein. It will be obvious to one skilled in the art that numerous circuit modifications can be employed to provide other embodiments of the amplifier of this invention. In each case, however, regenerative feedback must be provided between the speaker transformer and the audio amplification means, and cathode biasing be provided to suppress audio oscillation in the feedback circuit. An amplifier, correctly designed, incorporating such features when played in conjunction with a plural parallel speaker channel, will provide pseudo-stereo amplification with the brilliance and timbre which characterizes the amplification means of this invention. In amplifier 20, 115 volt line power is provided from plug 96 to center tap transformer 100 to provide 370 volt potential of opposite polarity in leads 92 and 92', respectively, to rectifying tube 35 which may be a 6X5 giving full wave rectification. Secondary 6 volt winding 93 is provided as a separate winding on transformer 100 for heating tube filament heaters 101, 101', 101'', 101''' and 101'''' as shown. Parallel connection is preferred for connecting the filaments, but series connection may be provided, if desired. Primary winding 91 of transformer 100 is grounded through 0.03 microfarad (mfd.) capacitor 102. B positive power lead 103 is charged to approximately 360–370 volts D.C. before passing through filtering inductance coil 99 and is charged to about 350 volts after passing. Coil 99 may have about 150 ohms impedence. Choke coil 99 is connected through two 200 kiloohm resistors 106 and 107 to plate 42 of tube 13. Two 40 mfd. capacitors 120 and 121 are provided on either side of choke coil 99 and ground. Cathode 40 of tube 13 is connected to ground as shown. Grid 41 of tube 13 is connected to the input of discriminator detector tube 19T8 of amplifier 10 as shown. Plate 42 of tube 13 is connected through .025 mfd. capacitor 26 to 500 kiloohm variable resistor 43, which comprises the volume control for amplifier 20. Resistor 43 is connected to ground as shown.

Cathode 50 of tube 15 is grounded through 160 ohm resistor 116, as shown. Control grid 51 of AF tube 15 is connected to variable resistor 43 through .01 mfd. capacitor 59 and to ground through 470 kiloohm resistor 117. Grid 52 of tube 15 is connected through 2 megohm resistor 57 to B positive power supply of lead 44. Grid 53 is connected to ground as shown. Plate 54 of tube 15 is connected to B positive lead 44 through 150 kiloohm resistor 108, and through 400 mmf. capacitor 56 to ground, and also through .005 capacitor 109 and 1 megohm resistor 110 to ground.

Cathode 60 of tube 16 is connected to ground through 2200 ohm resistor 68. Control grid 61 of tube 16 is connected to plate 54 of tube 15 as shown. Grid 62 is connected to B positive power lead 44 and to grid 72 of output tube 18 through 2 megohm resistor 67 as shown. Grid 63 is connected to ground. Plate 64 is connected through 400 mmf. capacitor 112 to ground. Plate 64 is also connected to B positive lead 44 through 220 kiloohm resistor 113 and 200 kiloohm resistor 114, through .005 mfd. capacitor 75 to control grid 71 of tube 18 as shown.

A .05 mfd. capacitor 118 and 470 kiloohm resistor 66 are provided betwen B positive lead 44 and grid 71 of output tube 18.

Output tube 18 comprises cathode 70 internally connected to grid 73. Control grid 71 is connected to plate 64 of tube 16 as shown. Cathode 70 is also grounded through 16 mfd. capacitor 76 as shown in parallel circuit with through resistors 77 and 78; resistor 77 comprising a 220 ohm resistor and resistor 78 being a variable resistor from 0 to 150 ohm and being biased usually for use herein at approximately 75 ohms. Grid 72 of output tube 18 is connected to B positive power supply lead 44 and also to grid 62 of tube 16 as shown. Plate 74 of tube 18 is connected to primary winding 19 of speaker transformer 31. The connection is reversed from that of a conventional degenerative coupled feedback as shown in FIGURE 3. Cathode 70 and plate 74 are connected in feedback arrangement through capacitor 118 as shown. Capacitor 118 is rated at .01 mfd. at 1600 cycles. Speaker 22 may have 3.2 ohms impedance for use with the circuit described.

The effect produced by simultaneously playing amplifiers 10 and 20 is one of producing pleasing sound with exceptional timbre and brilliance as hereinbefore described.

In FIGURE 2 is shown a modification of the device of FIGURE 1 wherein speaker transformer 31' is provided with primary winding 19' reversed thereon relative to FIGURE 1; i.e., lead 24', connecting output tube 18 (FIGURE 1), and lead 25', connecting to rectifier 6X5 (FIGURE 1) are reversed from the embodiment shown in FIGURE 1. Feedback lead 17' connects to grid 62 of tube 16 (FIGURE 1) in the same manner as does lead 17 of FIGURE 1, but is connected to the opposite side of secondary winding 21' of speaker transformer 31'. The circuits of FIGURES 1 and 2 are full equivalents for providing regenerative feedback coupling as will be readily understood.

In FIGURE 3 is shown an illustrative conventional embodiment of the speaker transformer connections providing degenerative feedback coupling (rather than regenerative coupling). The embodiment of FIGURE 3 is conventional and is not usable in the amplifier of this invention.

The circuit illustrated in FIGURES 1 and 2 are illustrative only and are not to limit the invention, it being understood that other conventional audio-amplifiers for frequency modulated signals may be used in conjunction with a second inventive amplifier as described herein wherein the speaker transformer of the inventive amplifier is connected with the leads to the primary winding of the speaker transformer reversed, or alternatively with the feedback lead from the secondary winding of the speaker transformer connected to provide regenerative coupling.

Resistor 78 in the circuit of output tube 18 is a variable resistor which can be manually biased to provide the desired suppression of audio-oscillation in speaker 22.

The astonishing effect produced in the embodiments of this invention wherein the combined output of the two amplifiers is apparently greater in intensity and in harmonic quality than are amplifiers of similar power output, may be achieved by connecting amplifier 20 as shown of FIGURE 1, or as modified in FIGURE 2, into the circuit of virtually any television or AM or FM radio receiver to be used in conjunction therewith to provide stereophonic sound reproduction. The adoption of such means in the manner hereinbefore described will be apparent to one skilled in the art.

The embodiment of the invention shown in FIGURE 1 utilizes AM-FM amplifier 10 switched for FM reception. If AM reception is desired, the connection of lead 11 is changed from pin 3 of tube 19T8 in amplifier 10 to pin 2 of the intermediate frequency band switch as labeled in the particular receiver disclosed. The connections to be made to intermediate frequency output components comparable to pin 3 of tube 19T8 or pin 2 of the IF hand switch of manufacture will be obvious to a person skilled in the art. The inventive audio frequency amplifier of this invention may thus be supplied with a signal from any conventional resonant and intermediate frequency amplifier stages and be used in conjunction with a conventional regenerative audio amplification stage as a plural parallel speaker channel, either for AM or FM transmission or may be used with phonograph, electric guitar amplification or the like as may be desired. It will also be apparent to a skilled person that capacitive means as well as resistive means may be provided in the cathode of an audio amplification tube to eliminate audio oscillation, such means being well known as described for regeneration circuits at page 208, Radio Handbook, 1959 Edition, Editors and Engineers Limited, Summerdale, California.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:

1. Audio reproduction apparatus comprising in combination at least one resonant frequency broadcast receiver, said receiver comprising resonant frequency and intermediate frequency amplification stages, at least two audio frequency amplifiers and at least two electro mechanical transducers, one of said audio frequency amplifiers comprising biasable means for limiting supply of electrons in amplification gain means thereof, means for passing only higher frequency input, regenerative feedback coupling between said one audio frequency amplifier and one of said transducers, the other of said audio frequency amplifiers and the other of said transducers being connected without regenerative feedback, said audio frequency amplifiers being connected to said receiver to provide plural output channels.

2. The article of claim 1 wherein said one audio frequency amplifier comprises electron tube means having at least cathode, control and anode electrodes, said cathode comprising electron supplying means.

3. The article of claim 2 wherein said one transducer comprises a transformer having a primary winding and a secondary winding, said regenerative feedback coupling being connected to said primary winding and to one of said control electrodes.

4. The article of claim 2 wherein said one transducer comprises a transformer having a primary winding and a secondary winding, said regenerative feedback coupling being connected to said secondary winding and to one of said control electrodes.

References Cited in the file of this patent

UNITED STATES PATENTS 2,559,354 Gauthier ---------------- July 3, 1951

FOREIGN PATENTS 1,232,719 France ---------------- Oct. 11, 1960